United States Patent
Krone et al.

(10) Patent No.: US 11,966,873 B2
(45) Date of Patent: Apr. 23, 2024

(54) DATA DISTILLERY FOR SIGNAL DETECTION

(71) Applicant: FAIR ISAAC CORPORATION, Roseville, MN (US)

(72) Inventors: Mary Krone, San Rafael, CA (US); Ryan Weber, Golden, CO (US); Ana Paula Azevedo Travassos, São Paulo (BR); Laura Waterbury, San Francisco, CA (US); Paulo Mei, São Paulo (BR); Mayumi Assato, Americana (BR); Shubham Kedia, Giridih (IN); Nitin Basant, Ramgarh Cantt (IN); Chisoo Lyons, San Rafael, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 0 days.

(21) Appl. No.: 17/659,643

(22) Filed: Apr. 18, 2022

(65) Prior Publication Data
US 2022/0245556 A1 Aug. 4, 2022

Related U.S. Application Data

(63) Continuation of application No. 16/557,572, filed on Aug. 30, 2019, now Pat. No. 11,341,449, which is a (Continued)

(51) Int. Cl.
*G06F 7/00* (2006.01)
*G06F 16/9035* (2019.01)
(Continued)

(52) U.S. Cl.
CPC ... *G06Q 10/06395* (2013.01); *G06F 16/9035* (2019.01); *G06F 16/9038* (2019.01); *G06N 20/00* (2019.01); *G06Q 10/067* (2013.01)

(58) Field of Classification Search
CPC ............ G06Q 10/06395; G06Q 10/067; G06F 16/9038; G06F 16/9035; G06N 20/00
(Continued)

(56) References Cited

U.S. PATENT DOCUMENTS

| | | |
|---|---|---|
| 10,545,975 B1 | 1/2020 | Mahdy et al. |
| 2014/0278800 A1 | 9/2014 | Nguyen et al. |

(Continued)

*Primary Examiner* — Isaac M Woo
(74) *Attorney, Agent, or Firm* — Mintz, Levin, Cohn, Ferris, Glovsky and Popeo, P.C.; F. Jason Far-hadian, Esq.

(57) ABSTRACT

Computer-implemented methods, systems and products for analytics and discovery of patterns or signals. The method includes a set of operations or steps, including collecting data from a plurality of data sources, the data having a plurality of associated data types, and filtering the collected data based on identifying viable data sources from which the data is collected. The method further includes prioritizing discovery objectives based on analyzing the filtering results, and enriching the filtered collected data from viable data sources according to the prioritized discovery objectives. The method further includes extracting one or more signals from the enriched data using one or more machine learning mechanisms in combination with qualified subject matter expertise input, and graphically displaying the extracted signals in a meaningful way to a human operator such that the human operator is enabled to understand importance of extracted signals.

20 Claims, 6 Drawing Sheets

Related U.S. Application Data continuation-in-part of application No. 16/137,230, filed on Sep. 20, 2018, now Pat. No. 10,885,055.

(51) Int. Cl.
    *G06F 16/9038*    (2019.01)
    *G06N 20/00*       (2019.01)
    *G06Q 10/0639*    (2023.01)
    *G06Q 10/067*     (2023.01)

(58) Field of Classification Search
    USPC .................................................. 707/600–899
    See application file for complete search history.

(56) References Cited

U.S. PATENT DOCUMENTS

| | | | |
|---|---|---|---|
| 2016/0065598 A1* | 3/2016 | Modi | .................. H04L 63/1408 |
| | | | 726/23 |
| 2020/0097591 A1 | 3/2020 | Basant et al. | |
| 2020/0097881 A1 | 3/2020 | Krone et al. | |

* cited by examiner

DATA DISTILLERY FOR SIGNAL DETECTION

CROSS-REFERENCE TO RELATED APPLICATIONS

This application is a divisional application claiming priority to and the benefit of the earlier filing date of U.S. patent application Ser. No. 16/557,572, filed Aug. 30, 2019, the content of which is incorporated by reference herein in its entirety.

The current patent application claims priority to and is a continuation-in-part of co-pending U.S. application Ser. No. 16/137,230 titled "Automated Data Enrichment and Signal Detection for Exploring Dataset Values," filed Sep. 20, 2018, the entire content of which is hereby incorporated by reference herein.

TECHNICAL FIELD

The subject matter described herein relates to systems and methods for data analytics and discovery of patterns or signals in large volumes of data based on prioritizing discovery objectives.

BACKGROUND

According to various estimates, 2.5 quintillion bytes of data are created every day. In every minute of each day, a number of data providers create and deliver data, often in response to user input. For example, App Store users download 51,000 apps per minute, Netflix® subscribers stream 77,000 hours of video per minute, Twitter® users send 350,000 tweets per minute, and Facebook® users "like" 4 million posts per minute.

Each of these actions generates data. Even with all the advancements in big data technologies, it can often be very difficult to understand and evaluate, let alone, use the data in a meaningful way. Traditional data mining or statistical methodologies require a predefined and specific goal, and do not fully uncover and explore the full potential value of information hidden in big data.

Traditional data evaluation methodologies often rely on a complete understanding of the data being evaluated as well as on a specific objective for the evaluation. Accordingly, what is needed are systems and methods that allow for evaluation of datasets without a specific objective, leveraging all types of data from any domain, even when initially there is a limited understanding of the data

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In one aspect, a computer-implemented method includes collecting data from a plurality of data sources, the data having a plurality of associated data types. The computer-implemented method further includes filtering the collected data based on identifying viable data sources from which the data is collected, in response to determining viability of the data sources. The computer-implemented method further includes prioritizing discovery objectives based on analyzing the filtering results, enriching the filtered collected data from viable data sources according to the prioritized discovery objectives, extracting one or more signals from the enriched data using one or more machine learning mechanisms in combination with qualified subject matter expertise input, and graphically displaying the extracted signals in a meaningful way to a human operator such that the human operator is enabled to understand importance of extracted signals.

In some variations one or more of the following features can optionally be included in any feasible combination. The plurality of data types may include one or more of time series data, audio data, photographic data and video data. The computer-implemented method may further include receiving information framing discovery objectives regarding aspects of a business plan, and the prioritizing prioritizes the discovery objectives regarding aspects of the business plan. The computer-implemented method may further include receiving information identified by one or more users where the information identifies data sources deemed to be relevant to the discovery objectives regarding the aspects of the business plan. The computer-implemented method may further include determining the viability of the data sources based on information describing aspects of a business plan. The computer-implemented method may further include receiving information identified by one or more users where the information identifies data sources deemed to be relevant to a specific discovery objective. The computer-implemented method may further include identifying other viable data sources based on the received information identifying data sources deemed to be relevant to the specific discovery objective, where collecting the data from the plurality of data sources may further include collecting data from the other identified viable data sources. The computer-implemented method may further include assessing quality of individual data sources from which data was collected, calculating quality indicators indicative of the assessed quality of the individual data sources; and providing, over a network to one or more participants, the calculated quality indicators indicative of the assessed quality of the data sources from which data was collected. Enriching the filtered collected data from the viable data sources can include combining one or more data elements from the filtered collected data to create characteristics and variables that make the one or more extracted signals more explicit. The computer-implemented method may further include processing at least some of the enriched collected data to identify relationships, anomalies or patterns within the enriched collected data. Enriching the filtered collected data can include using data wrangling techniques to generate an enriched form of at least some of the collected data, such that the enriched form is computationally actionable by a user.

The systems and methods disclosed herein provide faster processing than traditional analytics or data mining approaches, which becomes even more relevant in the context of big data and broad objectives. The systems and methods further provide processing large amounts of data in a fast, efficient and understandable way, in order to avoid the main bottlenecks of handling big data within the lack of a clear analytical goal. Accordingly, the systems and methods disclosed herein uncover value and opportunities from the data, instead of modeling for a pre-determined target.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

When practical, similar reference numbers denote similar structures, features, or elements.

DETAILED DESCRIPTION

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In the context of large volumes of data (in terms of size, number of observations, variables or data sources associated with the data), a main goal is to uncover indicators or signals that reflect relationships, patterns, events, anomalies or outliers from the data, leading to new analytic opportunities. The uncovered indicators or signals can include anything that helps one understand the dependence (or lack thereof) between the various data elements, data sources or variables. In accordance with one or more embodiments, systems and methods are provided for fast and efficient extraction of relevant signals from data in alignment with business goals or needs.

Traditional data evaluation methodologies often rely on a complete understanding of the data being evaluated as well as on a specific objective for the evaluation. Advantageously, the proposed systems and methods herein allow for an initial evaluation of datasets without a specific objective, leveraging all types of data from any domain without discrimination or limitation, even when initially there is a limited understanding of the data.

In accordance with some implementations, an initial objective assessment may be implemented to determine the value or reliability of one or more data sources. The data sources that show potential value may be selected, while also mapping analytic opportunities that rise from understanding the data, and enriching the data in light of a discovery objective in an efficient way, regardless of the volume of data.

Enriching the data within the context of this disclosure generally refers to combining data elements from one or more data sources to create characteristics and variables that could make the signals in the data more explicit. These characteristics and variables can describe the demographics, behavior, action, and other parameters associated with a single entity or multiple entities or even the relationship between the entities. Machine learning algorithms are applied to detect and prioritize the various types of signals in the data. The insights may be coupled with business expertise to provide guidance on how to act on the discovered insights with a long-term roadmap and a detailed analytic design for the next project.

Figure 1:
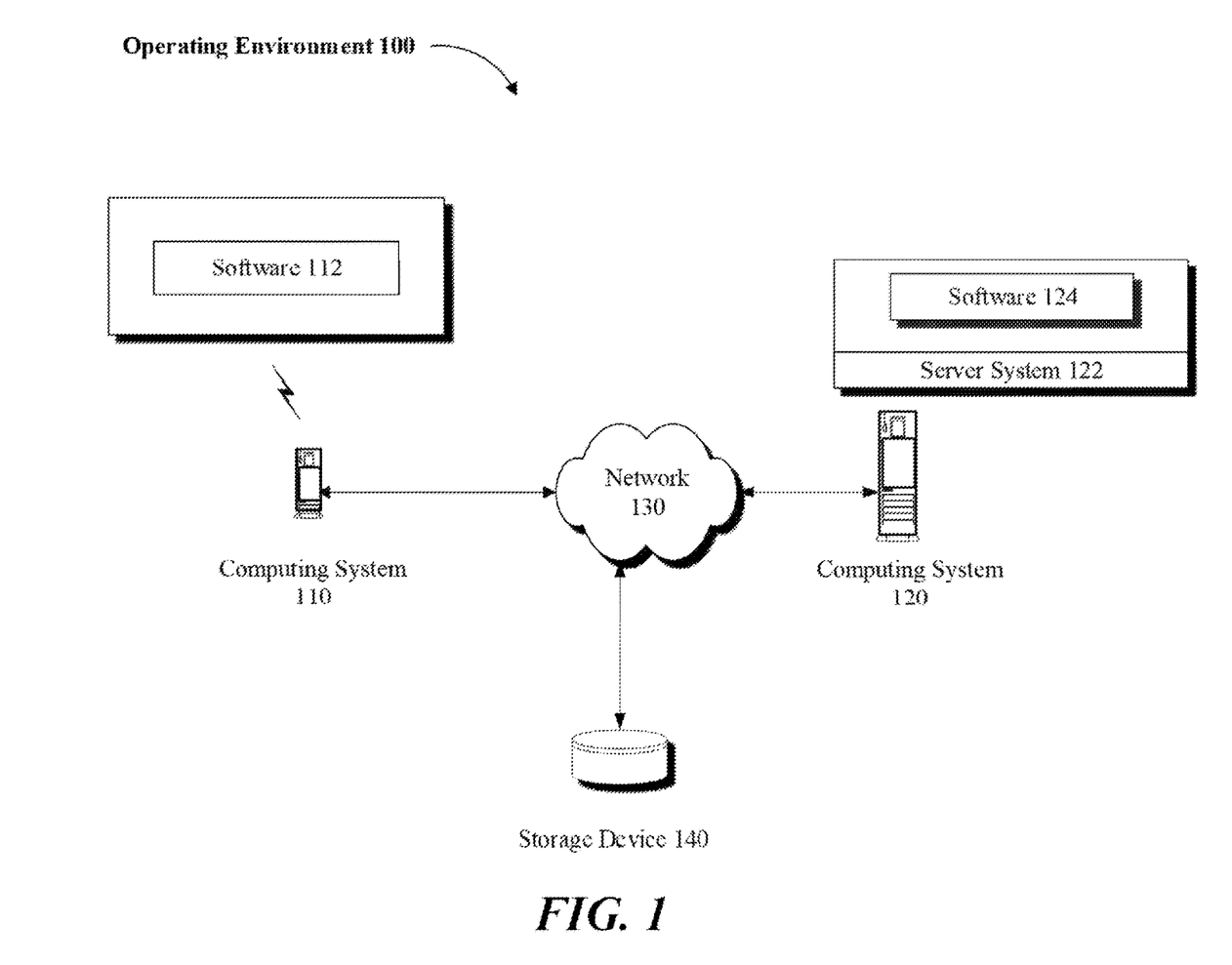
FIG. 1 illustrates an example operating environment in accordance with one or more embodiments, in which the operations and functionalities disclosed herein may be implemented.

Referring to FIG. 1, an example operating environment 100 is illustrated in which a computing system 110 may be used by a user to interact with software 112 being executed on computing system 110. The computing system 110 may be a general-purpose computer, a handheld mobile device (e.g., a smart phone), a tablet, or other communication capable computing device. Software 112 may be a web browser, a dedicated app or other type of software application running either fully or partially on computing system 110.

Computing system 110 may communicate over a network 130 to access data stored on storage device 140 or to access services provided by a computing system 120. Depending on implementation, storage device 140 may be local to, remote to, or embedded in one or more of computing systems 110 or 120. A server system 122 may be configured on computing system 120 to service one or more requests submitted by computing system 110 or software 112 (e.g., client systems) via network 130. Network 130 may be implemented over a local or wide area network (e.g., the Internet).

Computing system 120 and server system 122 may be implemented over a centralized or distributed (e.g., cloud-based) computing environment as dedicated resources or may be configured as virtual machines that define shared processing or storage resources. Execution, implementation or instantiation of software 124, or the related features and components (e.g., software objects), over server system 122 may also define a special purpose machine that provides remotely situated client systems, such as computing system 110 or software 112, with access to a variety of data and services as provided below.

In accordance with one or more implementations, the provided services by the special purpose machine or software 124 may include providing a user, using computing system 110 or software 112, with a unique approach to extract relevant signals from data sources, in alignment with business goals or needs. The methodology described herein is directed to evaluating multiple data sources, selecting potentially useful data in terms of quality and relevance, ingesting different types of data, enriching the data using plugins, for example, to work across different data types and then automatically detecting signals of potential interest.

As provided in further detail below, the systems and methods described herein can be supported by, but not dependent on, a signal extraction tool (e.g., Signal Box), as described in patent application Ser. No. 16/137,230, entitled "Automated Data Enrichment and Signal Detection for Exploring Dataset Values," filed on Sep. 20, 2018 from which this patent application depends. In some implementations, multiple phases for the evaluation of datasets without a specific objective are implemented. During the different evaluation phases, various types of data from a plurality of domains may be leveraged, even when initially there is a limited understanding of the data.

Figure 2:
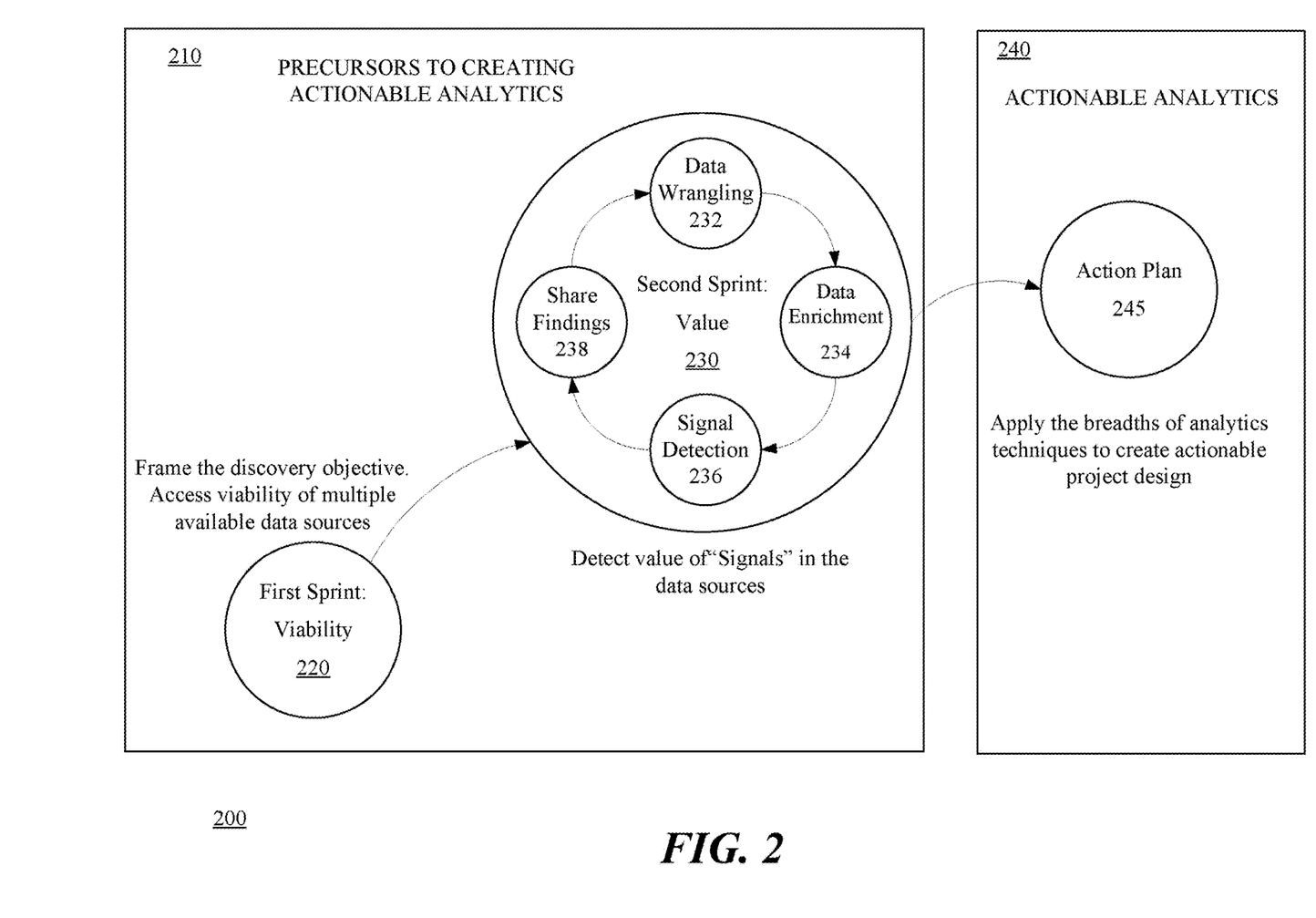
FIGS. 2 and 3 illustrate flow diagrams of methods for automatically detecting signals of potential interest from a multitude of data sources, in accordance with one or more implementations.

Referring to FIG. 2, a flow diagram 200 is illustrated in which a process automatically detects signals of potential interest from a multitude of data sources based on information describing aspects of a business plan, which can be used to formulate an action plan of a business. As shown, the process may have a first discovery portion 210 including multiple phases or sprints 220 and 230. During a sprint, signals of potential interest are automatically detected from a multitude of data sources based on information describing aspects of the business plan.

The discovery process of FIG. 2 may include a second actionable analytics portion 240 which applies various analytical techniques to create an actionable project design of an action plane 245. One or more example embodiments may include at least one of the following steps, and additional steps, in various orders of operation:

First Sprint 220
Frame a broad discovery objective;
Connect and consume a variety of data sources/types from any domain;
Apply a rapid methodology to filter the candidate data sources to those that are viable.
The viability of a data source may be measured based on, among other attributes, relevance, resolution, panorama, accuracy and accessibility;
Second Sprint 230
Clean the data and convert it into a form that is computationally actionable, using data wrangling techniques 232;
Enrich the viable raw data sources to make the implicit information explicit and readily available via data enrichment 234;
Extract signals via signal detection 236 using a variety of machine learning mechanisms and/or algorithms, combined with qualified subject matter expertise input;
Share findings 238 (e.g., graphically displaying the findings) to enable analysts to visualize the signals so that users can easily iterate and refine the signals;
Actionable Analytics 240
Interpret and act on the discovered insights to create an action plan 245.

The first sprint 220 may be utilized for assessing viability of possible data sources to explore, and on framing the discovery objective. The first sprint 220 defines the discovery objective. An example method may obtain discovery objective information through an interview process, facilitated by a questionnaire (e.g., a computer implemented or manual questionnaire) to be completed at the start of the project.

Figure 3:
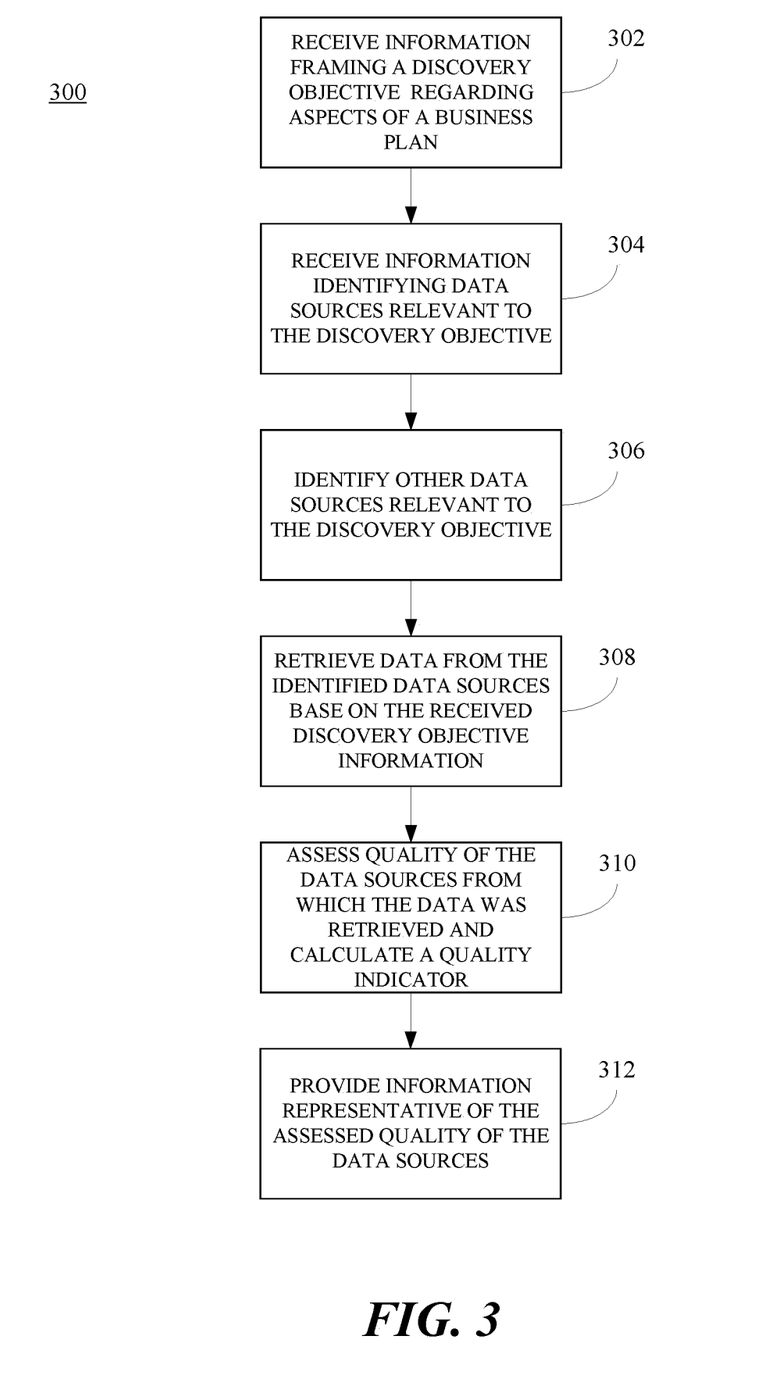

FIG. 3 illustrates a process 300 that may be used in the first sprint 220 for framing the discovery objective and assessing viability of multiple available data sources based on information describing aspects of a business plan and may be executed by at least one programmable processor of a system such as one or both of the computing system 110 or the computing system 120 of the server system 122. At 302, the at least one processor receives information framing a discovery objective regarding aspects of a business plan. At least a portion of the discovery objective information may be received in the form of a questionnaire or optionally a data assessment report.

The purpose of the questionnaire is to collect key information about the current state of the operation concerning aspects of the business within the scope of the project. The questionnaire can have a standard template, but several questions can be created specifically for each project. The questionnaire can be completed in as much detail as possible, but even if not all questions are answered prior to processing, the answered questions can allow identification of topics which may facilitate in preparation for further discussions. The questionnaire information is useful for data scientists to gain an initial understanding of the organization, processes, decision logic, technology and available data in place in order to facilitate discussions and complete effective and productive sessions during workshops.

In one implementation, a data scientist may formulate a template questionnaire, which can be used as-is for any analytic project, or may formulate a customized questionnaire if there is any previous knowledge around the project. Accordingly, information sufficient to enable a thorough understanding of the business context and objectives, as well as of data relevant to the business project, may be collected by way of the questioner.

The questionnaire may be communicated to a client machine used by a human operator or user, who is instructed to answer the questions contained in the questionnaire. The questions in the questionnaire may cover one or more of the following business aspects, as well as other aspects:
Overview of the Organization
Business and Marketing strategies
Product portfolio information
Customer definition
Operational processing
Information systems
Current analytic state
Data topography The data topography portion of the questionnaire may be unique to one or more users or clients so as to provide the necessary information to understand which data sources may be relevant to the discovery objective. In addition, the questionnaire may provide the necessary knowledge to understand data related to the business plan at a level of detail that is sufficient to produce meaningful analyses. The "data topography" in the data topography portion may include the following information:
Data sources and contacts (data users and data custodians)
Where and how the data is stored/accessed
How the data is formatted and structured
Data volumes/sizes
How different sources of data interrelate The completed version of the questionnaire may include a data assessment report, described below. Given the completed questionnaire and possibly the data assessment report, the involved individuals may conduct interviews to identify additional information to frame the discovery objective.

To help focus the discovery objective and ensure the discovery objective will lead to identifying signals having business value, candidate opportunities that are likely to extract value from the data can be identified during the interviews. Each candidate opportunity is a potential improvement/addition to business as-is that may be competing with other potential opportunities for time, attention and resources. For each candidate opportunity, an opportunity map may be created. The opportunity map may include at least the following information:

Feasibility/Data availability

Potential benefit

Time to value: Time elapsed between implementation and realization of business value Innovation aspects An example of information to be collected for each identified candidate opportunity may include one or more of at least the following: data availability, potential benefits, time to develop, time to value, effort, market potential, competitive landscape and risks.

Following the interviews conducted to identify information to frame the discovery objective, the data scientist(s) and the client may work together to prioritize the opportunities, define and document the discovery objective. By this point in the first sprint 220, a working definition of the discovery objective comprising one or more of the completed questionnaire, the data assessment report, the prioritized discovery objectives and the candidate opportunity map, will have been completed. Any or all of the information in the working definition of the discovery objective may be received at 302.

Based on the prioritized opportunities, the data scientist(s) and client team can work together to determine and execute a plan to identify data sources that are deemed to be relevant to the discovery objective. Referring to FIG. 3, at 304, the at least one processor receives the information identifying the data sources deemed to be relevant to the discovery objective.

At 306, the at least one processor identifies other data sources based on one or both of the relevant data source information received at 304 and the information framing the discovery objective received at 302. The other data sources can be identified using various data identification and search techniques using the information received at 302 and 304. For example, the data sources can be identified using the completed questionnaire, the data assessment report, a data dictionary, a database repository/layout, a data lake catalog from the client and other data sources. Any external data sources can be identified based on, for example, previous experience, reviewing public data sources, and/or through layouts provided by other vendors, data brokers or context brokers.

With the information obtained in the completed questionnaire, the data assessment report, the prioritized discovery objectives and/or the candidate opportunity map, it is feasible for the at least one processor to collect available data (e.g., at least a sample over a limited time period, if volumes are high) from at least some of the data sources identified at 304 and 306.

At 308, the at least one processor retrieves data from at least some of the data sources identified by the information received at 304 and 306 and based on the information framing the discovery objective received at 302. This can be done in a variety of ways, and the plan may be based upon individual client needs. Therefore this step can be described as: Data plan for the assessment: define applicable period(s), sampling plan (if necessary); Collect and merge data. The data can be retrieved in a number of ways which include but are not limited to a) transferring the data to the analytic data environment described herein using FTP, physical drive or other data storage and transfer mediums, b) remotely accessing the data within a client analytic data environment, and c) making data available on a (shared-access) cloud server environment representing with the analytic data environment described herein.

This data being retrieved could be all of the relevant data available or could be a sample of the relevant data available. The data sampling could be based on one or more techniques such as, for example, random sampling, stratified sampling, and/or sampling a specific time period from the data or sampling data related to a subset of entities. The individual data sources could be retrieved separately or some of the associated data sources could be joined and merged before being retrieved. The data retrieved at 308 is fed into an analytic data environment executed by the at least one processor.

After retrieving the data and feeding it into the analytic data environment at 308, the at least one processor, at 310, assesses the quality of individual data sources from which data was retrieved and calculates quality indicators indicative of the assessed quality of the individual data sources. The data sources are assessed in view of the relevance to the discovery objective across various dimensions such as integration, resolution, panorama, accuracy, and/or accessibility. The quality indicator could be a comparative ranking of the data sources or numbers that score the data sources across the various dimensions. The individual scores on each of the dimensions may be combined into a final score using several techniques such as sum, average, weighted sum/average, etc. In some cases, the quality indicator could be more subjective and simply classify the data sources into good, average, poor or similar subjective scales. The quality of each data source may be assessed across one or more dimensions such as:

Integration: Degree of match rate to other relevant data sources

Resolution: Degree to which the data is populated with meaningful values, is not missing and is of sufficient breadth and depth for the task at hand Panorama: Ability of the content within the data source (e.g. individual columns) to comprehensively describe the full picture, being applicable and helpful for the task at hand Accuracy: the extent to which data is correct and reliable, correctly populated in a consistent manner, and up-to-date Accessibility: the extent to which data is available, or easily and quickly retrievable At 312, the at least one processor provides, over a network to one or more participants, the calculated quality indicators indicative of the assessed quality of the data sources from which data was retrieved and may further provide information representative of one or more of the dimensions described above. The assessed quality information may be provided over a network in the form of an online, interactive presentation among two or more participants.

Referring back to FIG. 2, the two or more participants can discuss recommendations and supporting arguments regarding which data sources to use in the second sprint 230. These recommendations and supporting arguments can be summarized and visualized in a preliminary data assessment report, which in turn can be digitally communicated via a communications network to the two or more participants or others. This data assessment report can be used in a second iteration of the process 300 of FIG. 3.

Upon completion of one or more iterations of the process 300 of the first sprint 220, execution of the discovery portion 210 proceeds to the second sprint 230. The second sprint 230 includes a series of iterations, focused on finding where the value is in the data. This process may be facilitated by the Signal Box implementation disclosed in patent application Ser. No. 16/137,230, from which this patent application depends, and be used to derive relevant, new insights from the data and turn those insights into recommendations for achieving business value.

The second sprint 230 can iterate over the following steps as depicted in the flow diagram 200 of FIG. 2:

Data Wrangling 232: Prepare the data for analysis, transforming the complex raw data into a simple and usable format:
- Understand the data and how it relates to the discovery objective
- Merge multiple datasets appropriately
- Clean the data of incorrect records and/or non-relevant segments
- Transform the data and create new variables
- Validate the final dataset Data Enrichment 234: An example of the data enrichment 234 may join and aggregate files and generate dozens or even thousands of candidate signals (characteristics). To facilitate a comprehensive and un-biased data enrichment process, use of a variety of algorithms may be accessed via the proprietary Signal Box™ technology. These algorithms may include, without limitation, social network analysis, temporal behavior maps for analyzing transactional data, and/or text analytics.

Signal Detection, Prioritization and Visualization 236: An example of the signal detection 236 may include feeding the enriched dataset(s) into a signal detection, prioritization and visualization tool which executes machine learning algorithms to very quickly provide a comprehensive and prioritized analysis of the signals present in the data. The signal detection, prioritization and visualization tool can use parallel computing and distributed algorithm frameworks to speed up execution. Further, the Signal Box implementation as disclosed in patent application Ser. No. 16/137,230, from which this patent application depends, leverages a modular design to enable the use of the best available technology for signal detection. These signals may include relationships, linear and non-linear patterns and outliers. The prioritized signals may be visualized via a set of interactive reports.

Share and Review Findings 238: At 238, findings can be reviewed with the business team in order to refine the signals (filter out irrelevant or obvious signals), add business expertise and perspective, and make necessary adjustments to the data using iteration and collaboration. Together, the data scientist(s) and the client may iterate steps 232, 234, 236 and 238 until they are able to translate the mathematical signals present in the data into relevant, new insights that can be used to improve the associated business.

The second sprint 230 concludes when relevant, new insights have been uncovered and provided to the project team and the project team is able to design and recommend one or more analytic projects to implement in the actionable analytics portion 240. Given that a unified and enriched dataset has already been created, after applying this methodology, the data science team can apply the breadth of analytics techniques to fully leverage the unique data, for example in the form of:
- Discovered networks
- Signal libraries
- Supervised/unsupervised models
- Optimized strategies Thus, the final result of the methodology is an analytical project or action plan 245, chosen between many viable and valuable candidates identified in the steps 232 to 238, maximizing the benefits extracted from the data.

Details of example systems and methods for implementing operations of the second sprint 230 will now be described.

The systems and methods of the second sprint 230 utilize technology that is configured for receiving and consuming different types of data, potentially from multiple and usually different sources, wrangling the data, enriching the data and then automatically detecting signals of potential interest. The data wrangling, enrichment and the signal detection algorithms are flexible, to allow for a user to define the configurations of each. This configuration can be done through a user interface, such as, for example, a pre-configured application in FICO® Xpress Insight® to allow easy access to the platform as well as visual interactions with the data.

Figure 4:
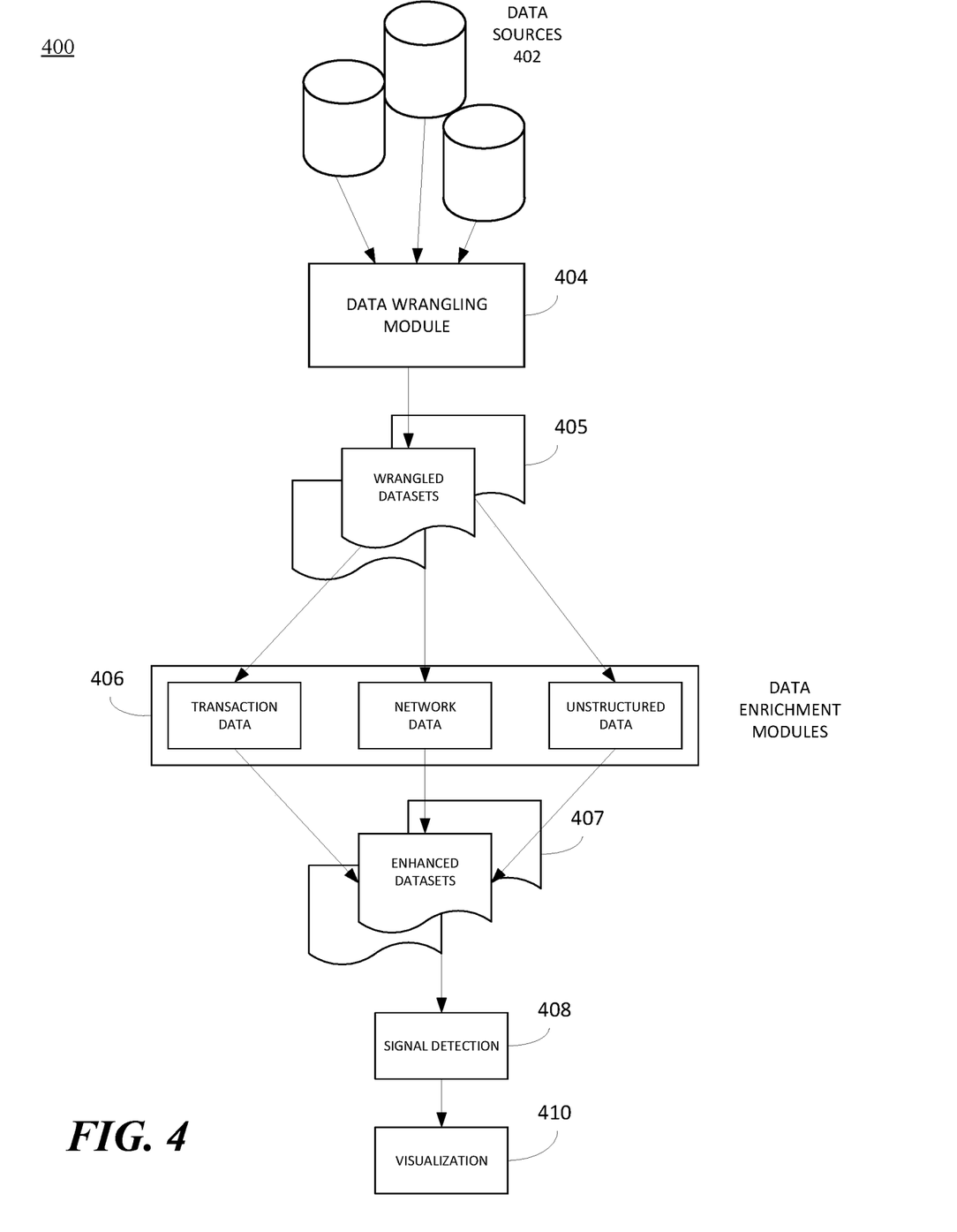
FIG. 4 shows a diagram illustrating aspects of a data enrichment system showing features consistent with one or more implementations.

FIG. 4 illustrates a system 400 for exploring value of one or more datasets from one or more data sources 402. The system 400 includes a data wrangling module 404 connected with the one or more data sources 402 to receive the one or more datasets, the data wrangling module 404 being configured to wrangle the one or more datasets into a form that is computationally actionable by a user. The term wrangling as used herein refers to the process of understanding the data and how it is related to the discovery objective, cleaning the datasets to treat incorrect/missing data, transforming the data into more relevant forms, merging multiple datasets, aggregating the data at one or more levels and validating the final dataset(s). The data sources 402 can include one or more of the data sources identified at 304 and 306 in the process 300 described above. The data sources 402 can include the data sources recommended by the one or more participants for use in the second sprint 230. The data sources 402 may be identified in the preliminary data assessment report. The datasets include at least some of the data retrieved at 308 in the process 300.

The data wrangling module 404 includes a number of sub-modules or sub-processes configured for cleaning the data, joining and/or merging different datasets, aggregating the data at desired or user-configurable levels, and combining and/or splitting fields of the data appropriately, etc., to form wrangled datasets 405. The wrangling can be done in a visual manner, such as, for example, through a user interface of the data wrangling module 404 in the FICO® Analytics WorkBench®, to make it easy for the user to interact with the data and manipulate it as necessary, or through scripts written for the data wrangling purposes. The system 400 can have a separate data wrangling module 404 as part of the platform, or can be integrated with an external data wrangling tool.

The system 400 may include one or more data enrichment modules 406 connected with the data wrangling module 404 and/or at least one of the one or more data sources 402. The one or more data enrichment modules 406 are configured to enrich at least some data from the one or more wrangled datasets 405 and/or the data sources 402 to generate enhanced datasets 407 which are enriched forms of at least some data corresponding to the one or more wrangled datasets 405 that are computationally actionable by the user. The data enrichment modules 406 may include one or more sub-modules or sub-processes to enrich different types of data. Examples of different sub-modules for data enrichment include a transactional data enrichment sub-module, a network data enrichment sub-module, and an unstructured data enrichment sub-module.

The transaction data enrichment sub-module enables creation of a large number of characteristics through comprehensive pre-defined templates. The transaction data enrichment sub-module allows users to configure events and metrics of interest on the transaction. It also allows users to select the different time intervals as well as templates which are relevant for the use case.

The network data enrichment sub-module enables detection of networks across datasets using the data available. These networks, depending on the data available, could be as simple as connecting individuals that share a phone number/email or individuals who transact with each other, or can be complex such as connecting medical providers who share more than a certain number of patients. The network data enrichment sub-module, through a user interface, allows users to configure networks by specifying linking fields and attributes as well other network features such as link strengths, etc. Once the networks have been detected, characteristics that summarize the information contained within these networks can be configured and generated in the module to enrich the original data.

The unstructured data enrichment sub-module can handle different types of unstructured data. For example, an unstructured text data module can help find keywords and concepts of relevance across unstructured text, and then generate characteristics based on those to enrich the one or more data sources 402. These characteristics can include, without limitation, a frequency of the keywords, a rate of the appearance of the keywords, etc.

In various implementations, the system 400 can include one or more of the several different data enrichment modules 406 described above, to handle still further different data types, such as a dataset related to a time series, audio data, photographs, videos, etc. Furthermore, the system 400 can include data enrichment modules 406 that are associated with specific types of enrichment techniques, such as a time series, or libraries, such as a credit card fraud characteristic library, as examples.

The different data enrichment modules 406 of the system 400 can run in parallel, generating independent enhanced datasets 407. Alternatively, an enhanced dataset 407 from one of the data enrichment modules 406 (or sub-modules) can be used as an input to one or more other data enrichment modules 406. For example, output from the transaction data enrichment sub-module can be used within the network data enrichment sub-module to aggregate the transaction-based characteristics across the network, or an audio-oriented data enrichment module may be configured to transcribe audio data to text, and then leverage the unstructured text data enrichment module for characteristics generation.

The enhanced datasets 407 are then processed for signal detection by a signal detection module 408 of the system 400. The signal detection module 408 runs calculations that are optimized for a particular purpose to identify any of relationships, anomalies, monotonic and/or non-monotonic patterns within characteristics (or combinations thereof) against each of the multiple objectives. In some example implementations, a base signal detection formula that allows for detection of different types of signals with minimal or no modification can be expressed generally as:

$$\text{strength of relationship} = \log\left\{\frac{P(x_m, y_n)}{P(x_m) * P(y_n)}\right\}$$

The above formula identifies relationships when values are sorted in decreasing order, but identifies outliers when values are sorted in increasing order. In addition, positive values signify a characteristic value occurring more frequently than random with an objective value, whereas negative values identify characteristic values that occur rarely with an objective value as compared to random.

A simple curve fitting over the strength identifies monotonic and non-monotonic patterns in the data. In addition, different metrics over the different characteristics and objective values inform the signal detection process of presence or absence of relationships and patterns as well the nature and strength of such relationships and patterns. In an example implementation, a curve fitting over a simple average of the characteristics for each objective value can be used to identify patterns within the data. The different characteristics and objectives can be further grouped in multiple ways and the respective strengths combined by taking sum, average, weighted sum/average to discover signals across these groups of characteristics and/or objectives. For example, the average strength of all transaction characteristics for a particular objective can inform the importance of transaction data for that objective.

The system 400 further includes a user interface which includes a visualization layer 410 configured for analyzing different types of signals detected. The visualization layer 410 creates graphs and visual graphics, which enable users to observe the signals in one or more of multiple views, i.e. through tables, graphs, and/or maps for geography-based characteristics, etc. The visualization layer 410 allows users to interact with the signals through multiple functionalities such as filters, sorting options, drill downs, etc.

The modular design of the system 400 allows it to be flexible and the different modules can be used at different points of the process as necessary. For example, in some scenarios it may be useful to do some part of the enrichment before data wrangling.

The system 400 can leverage a big data platform that facilitates working with large datasets in keeping with current requirements. For example, the underlying raw data can be stored in a distributed file system and the calculations done via parallel processing. However, the innovative design with the different modules kept loosely integrated with each other, as separate applications, still capable of communicating with one another, within the same software platform, allows the incorporation of the latest technologies quickly as individual modules can be swapped out for whatever is best in class, which can mean open source, commercially available, or custom-built. Data can be consumed and outputted independently at any module, and hence the users can choose to use the full platform or individual modules while performing the other tasks in external tools.

Figure 5:
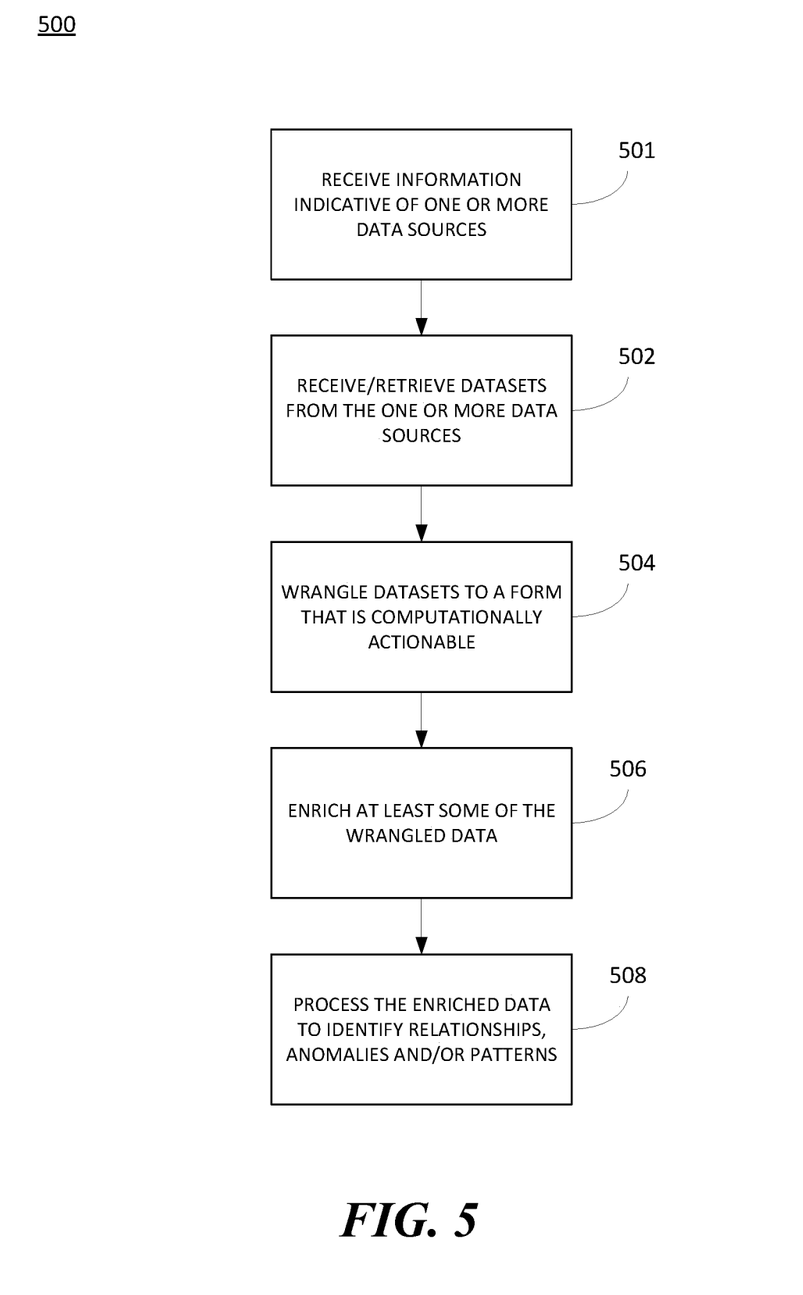
FIG. 5 shows a flow diagram illustrating aspects of a data enrichment method, in accordance with one or more implementations.

FIG. 5 is a flowchart of a process 500 of exploring value of one or more datasets from one or more data sources 402. At 501, the data wrangling module 404 receives information indicative of the one or more data sources 402. The data sources 402 may include the data sources identified by the information received at 304 in the method 300 discussed above. The data sources 402 may include the data sources identified at 306. Further, the data sources 402 may include data sources recommended for use by the two or more participants after completion of the first sprint 220. At 502, the data wrangling module 404 connected with the one or more data sources 402 receives and/or retrieves the one or more datasets. The one or more datasets may include at least some of the data retrieved at 308 in the process 300 discussed above with reference to FIG. 3. The data wrangling module 404 may retrieve the datasets from the one or more data sources 402 based on the information framing the discovery objective received at 302.

At 504, the data wrangling module 404 is configured to wrangle the one or more datasets into a form that is computationally actionable by a user. At 506, one or more data enrichment modules 406 connected with the data wrangling module 404 and/or at least one of the one or more data sources 402 enriches at least some data from the one or more wrangled datasets 405 to generate an enriched form (enhanced datasets 407) of at least some data corresponding to the one or more wrangled datasets 405 that is computationally actionable by the user. At 508, the signal detection module 408 connected with the data wrangling module 404, the data enrichment module 406, and/or the one or more data sources 402 processes the one or more wrangled datasets 405 and the enhanced datasets 407 including at least some data, to identify relationships, anomalies, and/or patterns within the one or more datasets.

The systems and methods disclosed herein provide faster processing than traditional analytics or data mining approaches, which becomes even more relevant in the context of big data and broad objectives. The systems and methods further provide processing of large amounts of data in a fast, efficient and understandable way, in order to avoid the main bottlenecks of handling big data within the lack of a clear analytical goal. Accordingly, the systems and methods disclosed herein uncover value and opportunities from the data, instead of modeling for a pre-determined target.

Figure 6:
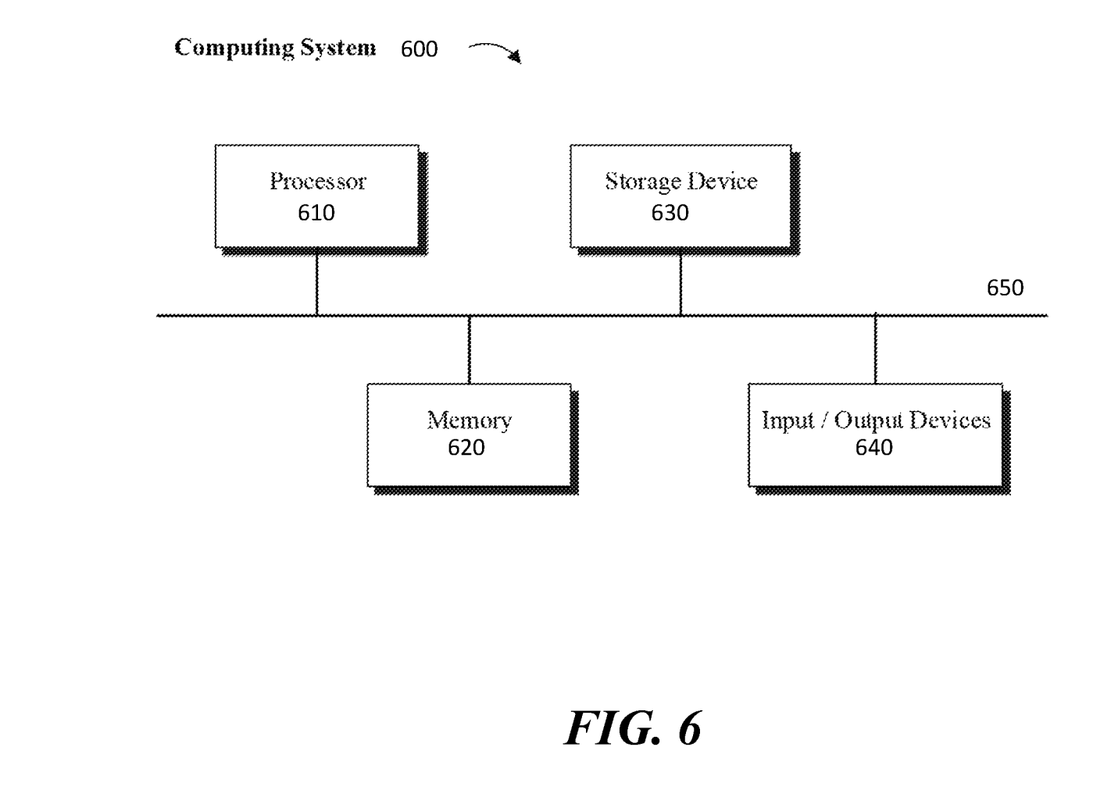
FIG. 6 is a block diagram of a computing system that may be utilized to perform one or more computer processes disclosed herein as consistent with one or more implementations.

Referring to FIG. 6, a block diagram illustrating a computing system 600 consistent with one or more embodiments is provided. The computing system 600 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 6, the computing system 600 may include a processor 610, a memory 620, a storage device 630, and input/output devices 640. The processor 610, the memory 620, the storage device 630, and the input/output devices 640 may be interconnected via a system bus 650. The processor 610 is capable of processing instructions for execution within the computing system 600. Such executed instructions may implement one or more components of, for example, a cloud platform. In some implementations of the current subject matter, the processor 610 may be a single-threaded processor. Alternately, the processor 610 may be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 may store data structures representing configuration object databases, for example. The storage device 630 is capable of providing persistent storage for the computing system 600. The storage device 630 may be a floppy disk device, a hard disk device, an optical disk device, or a tape device, or other suitable persistent storage means. The input/output device 640 provides input/output operations for the computing system 600. In some implementations of the current subject matter, the input/output device 640 includes a keyboard and/or pointing device. In various implementations, the input/output device 640 includes a display unit for displaying graphical user interfaces.

According to some implementations of the current subject matter, the input/output device 640 may provide input/output operations for a network device. For example, the input/output device 640 may include Ethernet ports or other networking ports to communicate with one or more wired and/or wireless networks (e.g., a local area network (LAN), a wide area network (WAN), the Internet).

In some implementations of the current subject matter, the computing system 600 may be used to execute various interactive computer software applications that may be used for organization, analysis and/or storage of data in various (e.g., tabular) format (e.g., Microsoft Excel®, and/or any other type of software). Alternatively, the computing system 600 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing products and/or functionalities. Upon activation within the applications, the functionalities may be used to generate the user interface provided via the input/output device 640. The user interface may be generated and presented to a user by the computing system 600 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented system comprising:
   at least one programmable processor;
   a non-transitory machine-readable medium storing instructions that, when executed by the at least one programmable processor, cause the at least one programmable processor to perform operations comprising:
   collecting data from a plurality of data sources stored on one or more data storage mediums connected over a communications network, the data having a plurality of associated data types;
   filtering the collected data based on identifying one or more viable data sources from which the data is collected;
   prioritizing discovery objectives based on analyzing the filtering results;
   enriching the filtered collected data according to the prioritized discovery objectives by combining one or more data elements that make one or more signals extracted from the filtered collected data more explicit;
   processing at least the enriched filtered collected data to identify one or more of relationships, anomalies and patterns within one or more datasets; and
   graphically displaying the one or more extracted signals according to the one or more of identified relationships, anomalies and patterns to a human operator, such that the human operator is enabled to understand importance of the one or more extracted signals.

2. The computer-implemented system of claim 1, wherein the plurality of data types include one or more of time series data, audio data, photographic data and video data.

3. The computer-implemented system of claim 1, the operations further comprising:
   receiving information framing discovery objectives regarding aspects of a business plan, wherein the prioritizing prioritizes the discovery objectives regarding aspects of the business plan.

4. The computer-implemented system of claim 3, the operations further comprising:
   receiving information identified by one or more users, the information identifying data sources deemed to be relevant to the discovery objectives regarding the aspects of the business plan.

5. The computer-implemented system of claim 1, the operations further comprising:
   determining viability of the data sources based on information describing aspects of a business plan.

6. The computer-implemented system of claim 1, the operations further comprising:
   receiving information identified by one or more users, the information identifying data sources deemed to be relevant to a specific discovery objective; and
   identifying other viable data sources based on the received information identifying data sources deemed to be relevant to the specific discovery objective;
   wherein collecting the data from the plurality of data sources further comprises collecting data from the other identified viable data sources.

7. The computer-implemented system of claim 1, the operations further comprising:
   assessing quality of individual data sources from which data was collected,
   calculating quality indicators indicative of the assessed quality of the individual data sources; and
   providing, over a network to one or more participants, the calculated quality indicators indicative of the assessed quality of the data sources from which data was collected.

8. The computer-implemented system of claim 1, wherein enriching the filtered collected data from the viable data sources comprises combining one or more data elements from the filtered collected data to create characteristics and variables that make the one or more extracted signals more explicit.

9. The computer-implemented system of claim 1, the operations further comprising:
processing at least some of the enriched collected data to identify relationships, anomalies or patterns within the enriched collected data.

10. The computer-implemented system of claim 1, wherein enriching the filtered collected data comprises using data wrangling techniques to generate an enriched form of at least some of the collected data, such that the enriched form is computationally actionable by a user.

11. A computer-implemented method comprising:
collecting data from a plurality of data sources stored on one or more data storage mediums connected over a communications network, the data having a plurality of associated data types;
filtering the collected data based on identifying one or more viable data sources from which the data is collected;
prioritizing discovery objectives based on analyzing the filtering results;
enriching the filtered collected data according to the prioritized discovery objectives by combining one or more data elements that make one or more signals extracted from the filtered collected data more explicit;
processing at least the enriched filtered collected data to identify one or more of relationships, anomalies and patterns within one or more datasets; and
graphically displaying the one or more extracted signals according to the one or more of identified relationships, anomalies and patterns to a human operator, such that the human operator is enabled to understand importance of the one or more extracted signals.

12. The computer-implemented method of claim 11, wherein the plurality of data types include one or more of time series data, audio data, photographic data and video data.

13. The computer-implemented method of claim 11, further comprising:
receiving information framing discovery objectives regarding aspects of a business plan, wherein the prioritizing prioritizes the discovery objectives regarding aspects of the business plan.

14. The computer-implemented method of claim 13, further comprising:
receiving information identified by one or more users, the information identifying data sources deemed to be relevant to the discovery objectives regarding the aspects of the business plan;
determining the viability of the data sources based on information describing aspects of a business plan.

15. The computer-implemented method of claim 11, further comprising:
receiving information identified by one or more users, the information identifying data sources deemed to be relevant to a specific discovery objective; and
identifying other viable data sources based on the received information identifying data sources deemed to be relevant to the specific discovery objective;
wherein collecting the data from the plurality of data sources further comprises collecting data from the other identified viable data sources.

16. The computer-implemented system of claim 11, further comprising:
assessing quality of individual data sources from which data was collected,
calculating quality indicators indicative of the assessed quality of the individual data sources; and
providing, over a network to one or more participants, the calculated quality indicators indicative of the assessed quality of the data sources from which data was collected, wherein enriching the filtered collected data comprises using data wrangling techniques to generate an enriched form of at least some of the collected data, such that the enriched form is computationally actionable by a user.

17. A computer program product comprising a non-transitory machine-readable medium storing instructions that, when executed by at least one programmable processor, cause the at least one programmable processor to perform operations comprising:
collecting data from a plurality of data sources stored on one or more data storage mediums connected over a communications network, the data having a plurality of associated data types;
filtering the collected data based on identifying one or more viable data sources from which the data is collected;
prioritizing discovery objectives based on analyzing the filtering results;
enriching the filtered collected data according to the prioritized discovery objectives by combining one or more data elements that make one or more signals extracted from the filtered collected data more explicit;
processing at least the enriched filtered collected data to identify one or more of relationships, anomalies and patterns within one or more datasets;
graphically displaying the one or more extracted signals according to the one or more of identified relationships, anomalies and patterns to a human operator, such that the human operator is enabled to understand importance of the one or more extracted signals;
receiving information framing discovery objectives regarding aspects of a business plan, wherein the prioritizing prioritizes the discovery objectives regarding aspects of the business plan;
receiving information identified by one or more users, the information identifying data sources deemed to be relevant to the discovery objectives regarding the aspects of the business plan; and
determining the viability of the data sources based on information describing aspects of a business plan.

18. The computer program product of claim 17, wherein enriching the filtered collected data from the viable data sources comprises combining one or more data elements from the filtered collected data to create characteristics and variables that make the one or more extracted signals more explicit.

19. The computer program product of claim 17, wherein at least some of the enriched filtered collected data are processed to identify relationships, anomalies or patterns within the enriched collected data.

20. The computer program product of claim 17, wherein enriching the filtered collected data comprises using data wrangling techniques to generate an enriched form of at least some of the collected data, such that the enriched form is computationally actionable by a user.

* * * * *